Patented July 1, 1930

1,769,717

UNITED STATES PATENT OFFICE

SAMUEL E. SHEPPARD AND LEON W. EBERLIN, OF ROCHESTER, NEW YORK, ASSIGNORS, BY MESNE ASSIGNMENTS, TO AMERICAN ANODE, INC., A CORPORATION OF DELAWARE

RUBBER EMULSION AND PROCESS OF MAKING THE SAME

No Drawing.    Application filed January 6, 1923. Serial No. 611,162.

This invention relates to rubber emulsions and processes of making the same. One object of the invention is to produce an emulsion of rubber which can be kept or transported without spoiling. Another object is to provide an emulsion having suspended droplets of the desired size and of great uniformity. Still another object of the invention is to provide such an emulsion which is stable under proper conditions of storage and use. A further object of the invention is to provide an emulsion, the droplets of which may carry a conditioning agent, such as vulcanizing material, like sulfur. Another object of the invention is to provide an emulsion from which the rubber droplets may be deposited and yet the material can be stored and kept with practically no fire hazard. Still another object of the invention is to provide a process of making such emulsions which will be inexpensive and easily controlled. Other objects will hereinafter appear.

Rubber emulsions are of technical importance. They may be used, for example, in the process of electrodeposition disclosed in our prior application, Serial No. 540,800, filed Mar. 3, 1922, for electrodeposition of rubber coatings, of which the present case is a continuation in part. Rubber latex does not meet technical requirements because, among other defects, it is not stable but is liable to ferment with a destruction of the emulsion or the useful qualities thereof. Moreover, it has to be transported thousands of miles before use. As it is largely aqueous, the shipping of it amounts to paying freight chiefly on water.

We, however, have produced emulsions that do not spoil and that may be made near the place where used without needless transporting of water. They are also in other ways superior to latex. While our discovery of new emulsions and processes can be utilized in a great many specific ways, we shall describe the details of a few of them by way of illustration.

Broadly, we add any solution of rubber in a proper solvent, preferably one that is insoluble or immiscible with water, to an aqueous solution in the presence of an emulsifying agent, emulsification being effected by agitation. Thus we may take 1000 cc. of a 5% solution of rubber (say plantation sheet) in benzol, which is diluted with 1000 cc. of kerosene. To this we may add 500 cc. of sulfonated castor oil (so-called "water-soluble oil") and this mixture is then stirred into 3000 cc. of an aqueous solution containing 150 grams of castile soap, which is the main emulsifying agent. The sulfonated castor oil (also called "Turkey red oil") is not indispensable in this example, but here acts usefully as an auxiliary or intermediate emulsifier, by which term we include any substance which assists the main emulsifying agent in bringing and maintaining the rubber in the emulsified state. Nor is the kerosene necessary, but we prefer to use some such diluent, especially since its quantity is so small as not to appreciably increase the fire hazard during use.

One or more pigments like lampblack may be added, if desired, to the original rubber solution before emulsification. Vulcanizing agents, like sulphur, can also, if desired, be added to the rubber solution prior to emulsification, or they may be added in solution or in colloidal form to the emulsion, being properly stirred therein. Colloidal sulfur and its preparation are well known, the following being typical instances: Kolloid Zeitschrift, Vol. IV, (1909) pages 307 and 308; Kolloid Zeitschrift, Vol. II, (1908) pages 358, 359 and 360. Likewise an accelerator of vulcanization, such as aniline sulfate, may be added to the rubber solution prior to emulsification. The quantities of these various conditioning agents will vary from zero to the amount necessary to effect the change desired, as will be understood by those skilled in the art. For the production of lightly colored coatings and for coatings in which only partial vulcanization is to be obtained, as explained in our application hereinabove cited, only correspondingly small amounts of them need be incorporated in the emulsion.

In a simpler form of our invention we add with suitable agitation 1000 grams of a 5% solution of rubber in benzol to 1000 grams of water containing 5 grams of sulfonated castor oil and 50 cc. of ammonia (26° Bé.).

We have found that the viscosity of the rubber solution at the time when emulsification takes place is of importance. A lowering of the viscosity enables a larger ratio of rubber solution to aqueous solution to be more readily employed in the emulsification. For example, a fresh 2½% solution of rubber in benzol having a viscosity at 35° C., which is 3500 times greater than water at 35° C., is about the upper limit of useful viscosity. It requires four times it own amount of water to effect desirable emulsification, and the latter can be effected only with an extra large amount of emulsifying agent and by very thorough mechanical treatment. On the other hand, with a 1% solution of rubber in benzol, but having a viscosity of only 150 times that of water at 35° C., the ratio of the rubber solution to water solution can be as low as 1 to 1.

The desired reduction of the viscosity of rubber solutions in organic solvents, of which benzol is typical, can be effected in many ways,—for instance, by exposure to ultra-violet light, or sunlight, by heating, by depolymerizing solvents, and by extra mechanical working or agitation. Of course, these methods may be employed singly or combined. As an illustration, a 5% solution of rubber in benzol may be exposed for two months to sunlight.

We have also found that the stability of rubber emulsions is increased by alkalies (including amines). As emulsifying agents, a wide variety of substances can be used, such as alkaline proteinates, colloidal clay suspensions, ammonium oleate, ammonium ricinoleate, compounds of other fatty acids whether saturated or unsaturated with alkali metals or ammonia, sodium phenolate, sodium cresolate, etc. The emulsifying agents hereinabove enumerated are all independent, that is, they act regardless of impurities in the rubber.

The agitation by means of which the emulsification takes place when the aqueous and rubber solutions are combined may be effected in a variety of ways such as by violent agitation, by paddles, by steam jets, by grinding, and by spraying, or various combinations of these. Simple shaking of the materials may be employed, but any form of agitation is preferably followed by a homogenizing action,—that is, agitation is repeated until the particles approach a nearly uniform size. We prefer to continue the agitation until the largest particles or droplets are of the order of $1.\mu$ or less. A steam injection emulsor, the emulsion being discharged under pressure through baffles, is one useful way of accomplishing this result. We have also found that a digestion of the emulsion under moderate pressure in an autoclave improves the stability of the final product.

The emulsions thus produced are white milky liquids, the droplets of which may vary considerably in size, but for most purposes should be, as stated above, of the order of $1.\mu$ and less. They are freely flowable,—that is, they can be poured by gravity in the way that milk and cream can be poured. Their keeping qualities are emphasized if they are maintained in closed vessels practically unexposed to light and air. In open vessels their stability is satisfactory for most purposes, a cream tending to form at the surface; but this is readily redispersed by a slight shaking or agitation. When exposed for a long time to daylight, the emulsion gradually darkens without, however, impairing its useful properties for most purposes.

While we do not wish to be restricted by a particular theory, we believe that when conditioning agents, such as pigments, sulfur, aniline sulfate, and the like are used, each droplet carries its proportion of such agent. At least when the droplets are electrodeposited, as described in our hereinabove cited application, these substances enter with the droplets into the coating. It will be noted that our emulsions, whether conditioning agents be added or not, are substantially free from material in a fermentable state, such as readily decomposible albumens present in natural latex. In other words, they do not produce harmful decomposition, and the result is that they possess great practical stability.

Having thus described our invention, what we claim as new and desire to secure by Letters Patent is:

1. In the process of preparing rubber emulsions, the steps of dissolving rubber, exposing the solution to chemically active rays until the viscosity of the solution is reduced, and emulsifying the solution in an aqueous bath.

2. In the process of preparing rubber emulsions, the steps of dissolving rubber, adding the solution with agitation to an aqueous bath in the presence of an emulsifying agent until a preliminary emulsion is formed, and continuing the agitation to lessen and render more nearly uniform the sizes of the droplets until the larger droplets are of the order of $1.\mu$.

3. In the process of preparing rubber emulsions, the steps of dissolving rubber, adding the solution with agitation to an aqueous bath in the presence of an emulsifying agent, and digesting the resulting emulsion under pressure.

4. In the process of preparing rubber emulsions, the step of adding with agitation to an alkaline aqueous bath in the presence of an organic emulsifying agent a solution of a rubber compound comprising in intimate admixture rubber and a conditioning agent for said rubber.

5. In the process of preparing rubber emulsions, the steps of dissolving rubber containing in intimate admixture therewith a conditioning agent for rubber in a liquid which is substantially insoluble in water, and adding said solution with agitation to an alkaline aqueous bath containing an organic emulsifying agent.

6. In the process of preparing rubber emulsions, the step of agitating a solution of rubber normally immiscible with water into an aqueous bath in the presence of an emulsifying agent until the largest droplets of the resulting emulsion are of the order of $1.\mu$, the weight of the emulsifying agent being less than the weight of the water.

7. A flowable aqueous emulsion adapted for electrodeposition, comprising a main emulsifying agent, an auxiliary emulsifying agent, and droplets which contain unvulcanized rubber and a conditioning agent for said rubber.

8. In the process of preparing rubber emulsions, the steps of dissolving rubber containing in intimate admixture therewith a conditioning agent for rubber and adding the solution to an aqueous bath with agitation in the presence of an emulsifying compound which is independent of any natural impurities in the rubber, said bath being substantially free from fermentable albuminous substances.

9. In the process of preparing rubber emulsions, the steps of dissolving rubber containing in intimate admixture therewith a conditioning agent for rubber and adding the solution with agitation to an aqueous bath in the presence of an emulsifying compound which is independent of any natural impurities in the rubber, the weight of emulsifying compound being less than the weight of the water.

10. In the process of preparing rubber emulsions, the steps of dissolving rubber, reducing the viscosity of the solution, while substantially maintaining its concentration, and emulsifying said solution in an aqueous bath.

11. In the process of preparing freely flowable rubber emulsions, the step of adding with agitation to a freely flowable aqueous bath in the presence of an emulsifying agent a solution of a rubber compound comprising in intimate admixture rubber and colloidal sulfur.

12. An aqueous emulsion, the droplets of which contain in intimate admixture unvulcanized rubber and a vulcanizing mixture comprising a vulcanizing material and an accelerator.

13. An aqueous emulsion, the droplets of which contain in intimate admixture unvulcanized rubber, sulfur, and an accelerator.

14. A rubber emulsion containing an organic emulsifying agent and droplets, containing in intimate admixture rubber and vulcanizing material, suspended in an aqueous alkaline solution.

15. A rubber emulsion containing an organic emulsifying agent and droplets comprising in intimate admixture rubber and sulfur suspended in an aqueous alkaline solution.

16. A rubber emulsion containing an organic emulsifying agent and droplets comprising in intimate admixture rubber, vulcanizing material, and an accelerator, said droplets being suspended in an aqueous alkaline solution.

17. In the process of preparing freely flowable rubber emulsions, the step of adding with agitation to a freely flowable aqueous bath in the presence of an organic emulsifying agent a solution of a rubber compound containing in intimate admixture rubber and a vulcanizing agent.

18. In the process of preparing freely flowable rubber emulsions, the step of adding with agitation to a freely flowable aqueous bath in the presence of an organic emulsifying agent a solution of a rubber compound containing in intimate admixture rubber and sulfur.

19. In the process of preparing freely flowable rubber emulsions, the step of adding with agitation to a freely flowable aqueous bath in the presence of an organic emulsifying agent a solution of a rubber compound containing in intimate admixture rubber and a vulcanizing mixture containing vulcanizing material and an accelerator.

20. A flowable alkaline aqueous emulsion, comprising an emulsifying compound and droplets which contain in intimate admixture unvulcanized rubber and a vulcanizing mixture containing an accelerator.

21. In the process of preparing aqueous emulsions of rubber, the step of adding with agitation to an aqueous medium in the presence of an emulsifying agent a dispersible admixture containing rubber and a conditioning agent for rubber intimately admixed therewith.

22. In the process of preparing aqueous emulsions of rubber, the step of adding with agitation to an aqueous medium in the presence of an emulsifying agent a dispersible admixture containing rubber and colloidal sulphur intimately admixed therewith.

23. In the process of preparing aqueous emulsions of rubber, the step of adding with agitation to an aqueous medium in the presence of an emulsifying agent a dispersible admixture containing rubber and an accelerator of vulcanization intimately admixed therewith.

24. An aqueous rubber emulsion the droplets of which contain an intimate admixture of rubber and a vulcanizing agent for rubber.

25. An aqueous emulsion of rubber the droplets of which each contain an intimate admixture of rubber and an accelerator of vulcanization of rubber.

26. An aqueous emulsion of rubber the droplets of which each contain an intimate admixture of unvulcanized rubber, sulphur, and an accelerator.

27. An aqueous emulsion of rubber the continuous phase of which comprises an organic emulsifying agent and the disperse phase of which comprises minute droplets of rubber containing a conditioning agent intimately admixed with the rubber.

28. An aqueous rubber emulsion having a continuous liquid phase comprising an organic emulsifying agent and a disperse phase comprising droplets of rubber each containing sulphur in colloidal form intimately admixed therewith.

29. An aqueous rubber emulsion having a continuous liquid phase comprising an organic emulsifying agent and a disperse phase comprising droplets of rubber each containing an accelerator of vulcanization intimately admixed therewith.

30. In the process of making aqueous emulsions of rubber, the steps which comprise preparing a dispersible rubber compound having a conditioning agent intimately incorporated therein, and emulsifying the rubber compound to form an aqueous emulsion having droplets each comprising an intimate admixture of rubber and of the conditioning agent.

31. In the process of making aqueous emulsions of rubber, the steps which comprise preparing a dispersible rubber compound having sulphur in colloidal form intimately incorporated therein, and thereafter emulsifying the rubber compound in an aqueous medium comprising an emulsifying agent to produce dispersed droplets each comprising an intimate admixture of rubber and of colloidal sulphur.

32. In the process of making aqueous emulsions of rubber, the steps which comprise preparing a dispersible rubber compound having an accelerator of vulcanization intimately incorporated therein, and thereafter emulsifying the rubber compound in an aqueous medium comprising an emulsifying agent to produce dispersed droplets each comprising an intimate admixture of rubber and an accelerator of vulcanization.

33. A pigmented emulsion of unvulcanized rubber in which the rubber droplets each contain a portion of the pigment.

34. A pigmented emulsion of unvulcanized rubber in an aqueous medium comprising dispersing agents in which the rubber droplets each contain a portion of the pigment.

35. A pigmented alkaline emulsion of unvulcanized rubber in an aqueous medium, pigment particles being contained in the rubber droplets of the emulsion.

36. A pigmented emulsion of unvulcanized rubber in an aqueous soap solution in which the rubber droplets each contain a portion of the pigment.

Signed at Rochester, New York, this 2nd day of January 1923.

SAMUEL E. SHEPPARD.
LEON W. EBERLIN.